(12) United States Patent
Froehlich et al.

(10) Patent No.: US 7,886,615 B2
(45) Date of Patent: Feb. 15, 2011

(54) METHOD FOR MONITORING AN ULTRASOUND FLOWMETER SYSTEM AND/OR PROCESS

(75) Inventors: Thomas Froehlich, Münchenstein (CH); Andreas Berger, Reinach (CH); Klaus Bussinger, Reinach (CH)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 11/992,486

(22) PCT Filed: Sep. 7, 2006

(86) PCT No.: PCT/EP2006/066115

§ 371 (c)(1),
(2), (4) Date: Feb. 16, 2010

(87) PCT Pub. No.: WO2007/033911

PCT Pub. Date: Mar. 29, 2007

(65) Prior Publication Data

US 2010/0139415 A1 Jun. 10, 2010

(30) Foreign Application Priority Data

Sep. 22, 2005 (DE) .................. 10 2005 045 485

(51) Int. Cl.
*G01F 1/66* (2006.01)
(52) U.S. Cl. .................................. 73/861.28
(58) Field of Classification Search .............. 73/861.28, 73/861.355, 861.356, 861.357
See application file for complete search history.

(56) References Cited

U.S. PATENT DOCUMENTS

| 4,015,470 A | * | 4/1977 | Morrison | 73/861.03 |
| 4,102,186 A | * | 7/1978 | Brown | 73/861.27 |
| 4,109,523 A | | 8/1978 | Teyssandier | |
| 4,162,630 A | * | 7/1979 | Johnson | 73/861.27 |
| 4,462,261 A | | 7/1984 | Keyes | |
| 5,228,347 A | * | 7/1993 | Lowell et al. | 73/861.28 |
| 6,089,104 A | * | 7/2000 | Chang | 73/861.27 |

FOREIGN PATENT DOCUMENTS

| DE | 100 54 199 A1 | 5/2002 |
| DE | 102 30 607 A1 | 2/2004 |
| DE | 692 33 140 T2 | 5/2004 |

(Continued)

*Primary Examiner*—Jewel Thompson
(74) *Attorney, Agent, or Firm*—Bacon & Thomas, PLLC

(57) ABSTRACT

A method for system- and/or process-monitoring in the case of an ultrasound flow measuring device having a plurality of measuring channels, wherein a medium flows though a pipeline or measuring tube in the direction of a longitudinal axis of the pipeline or measuring tube. Ultrasonic measuring signals are coupled into the pipeline or measuring tube and coupled out of the pipeline or measuring tube in such a way that they travel through the medium along different sound paths. Following passage through the pipeline or measuring tube, the ultrasonic measuring signals are detected in the individual measuring channels, wherein at least one actual quantity describing the ultrasonic measuring signal of each measuring channel is ascertained. The actual quantity is compared with a desired quantity captured under predetermined system- or process-conditions, and a report is output in the case of a difference between the ascertained, actual quantity and the captured, desired quantity.

15 Claims, 2 Drawing Sheets

FOREIGN PATENT DOCUMENTS

| DE | 102 58 997 A1 | 6/2004 |
| DE | 102 55 698 A1 | 7/2004 |
| DE | 103 28 294 A1 | 1/2005 |
| EP | 0 537 735 A2 | 4/1993 |
| WO | WO 02/35186 A1 | 5/2002 |

* cited by examiner

US 7,886,615 B2

METHOD FOR MONITORING AN ULTRASOUND FLOWMETER SYSTEM AND/OR PROCESS

TECHNICAL FIELD

The invention relates to a method for system and/or process monitoring in the case of an ultrasonic flow measuring device having one or more measuring channels, wherein a medium flows through a pipeline or a measuring tube in the direction of the longitudinal axis of the pipeline or measuring tube, wherein ultrasonic measuring signals are coupled into the pipeline or measuring tube and out of the pipeline or measuring tube in such a manner that they travel through the medium on different sound paths, and wherein the ultrasonic measuring signals, after the passage through the pipeline or through the measuring tube, are detected in the individual measuring channels. The ultrasonic flow-measuring device can be an in-line flow-measuring device or a clamp-on flow-measuring device.

BACKGROUND DISCUSSION

In connection with the determining and/or monitoring of process quantities in process automation, the trend is increasingly in the direction of making available to the user, besides the actual measured value of, for example, flow, e.g. flow rate, pressure, fill level, temperature, conductivity, or ion concentration, also information concerning current or future functionality, or remaining service life, of the measuring device under the reigning system and/or process conditions. Current catchwords in this connection are 'predictive maintenance', 'advanced diagnostics' and 'meantime before failure'. Goal of these efforts is, in the end, to prevent, or reduce to a minimum, measuring-device down-time and to increase the quality of the delivered, measured values.

SUMMARY OF THE INVENTION

An object of the invention is to provide a method enabling current and predictive statements as regards the ability of an ultrasonic flow-measuring device to function.

The object is achieved according to a first embodiment by the features that at least one actual-quantity describing the ultrasonic measuring signal of each measuring channel is ascertained, the actual-quantity is compared with a desired-value captured under predetermined system or process conditions, and, in the case of a deviation between the ascertained actual-quantity and the captured desired-quantity, a report is output. According to an advantageous further development of the method of the invention, it is provided that the report is output when the actual-quantity lies outside a predetermined tolerance for the desired-quantity. Especially, this solution is suited for delivering statements as regards the ability of the flow-measuring device to function. The desired-quantity is determined, for example, at start-up of the flow-measuring device, or it is ascertained and stored after the reaching of steady state. The error report, which is output, can be, for example, a body-sound, a report 'Signal Low' or a relevant signal/noise ratio.

The object is achieved according to an alternative embodiment by the features that at least one actual-quantity describing the ultrasonic measuring signal is ascertained for a first measuring channel and one for a second measuring channel, the actual-quantity of the first measuring channel is compared with the corresponding actual-quantity of the second measuring channel, and, in the case of a deviation between the actual-quantity of the first measuring channel and the actual-quantity of the second measuring channel, a report is output. Also, in the case of this embodiment, it is provided that a report is first output, when the actual-quantity of the first measuring channel lies outside a predetermined tolerance for the actual-quantity of the second measuring channel. In the case of this solution, the circumstance is used that, in the case of a plurality of measuring channels, provided information is redundantly present, a fact which can be made use of for comparing the information delivered by the individual measuring channels among one another, to draw conclusions as regards system or process changes.

According to an advantageous, further development of the method of the invention, a cyclic storing of the measured actual-quantities is provided. Especially on the basis of the measured and stored actual-quantities, historical data reflecting trend of system or process changes is made available.

Preferably, in connection with the method of the invention, signal strength of the ultrasonic measuring signals or velocity of sound in the medium is used as actual-quantity. In this way, it is especially provided that, in the case of a change of the actual-quantity 'signal strength' relative to the stored desired-quantity 'signal strength', the report is output that more strongly absorbing or more weakly absorbing medium is flowing through the pipeline or through the measuring tube. Moreover, it is provided that, in the case of a deviation of the actual-quantity 'signal strength' in the first measuring channel relative to the actual-quantity 'signal strength' in the second measuring channel, the report is output that, in the region of the measuring channel, a system error has occurred, or that, in the measuring channel, a fouling has taken place. In the case of a clamp-on flow-measuring device, such can involve a coupling problem between ultrasonic sensor and tube wall. If, in contrast, the signal strength changes in all measuring channels simultaneously, this can lead to the conclusion that an application error has arisen. By this method of comparison, the flow-measuring device can perform a self-diagnosis and provide the user with corresponding proposals for getting rid of the problem, or directions for error analysis. From the measured process variables and the signal changes on individual or all measuring channels, moreover a trend can be presented. Thus, it is especially also possible to provide the user with a date for the next inspection of the flow-measuring device.

As indicated above, also the velocity of sound can be drawn upon for analysis purposes. If the velocity of sound changes in all measuring channels simultaneously, while the medium stays the same, this is an indication of a temperature change of the evaluated medium and a corresponding output results. If, in contrast, a deviation of the velocities of sound measured in the individual measuring channels occurs, then a report is output that the medium is composed of a plurality of phases.

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

Figure 1:
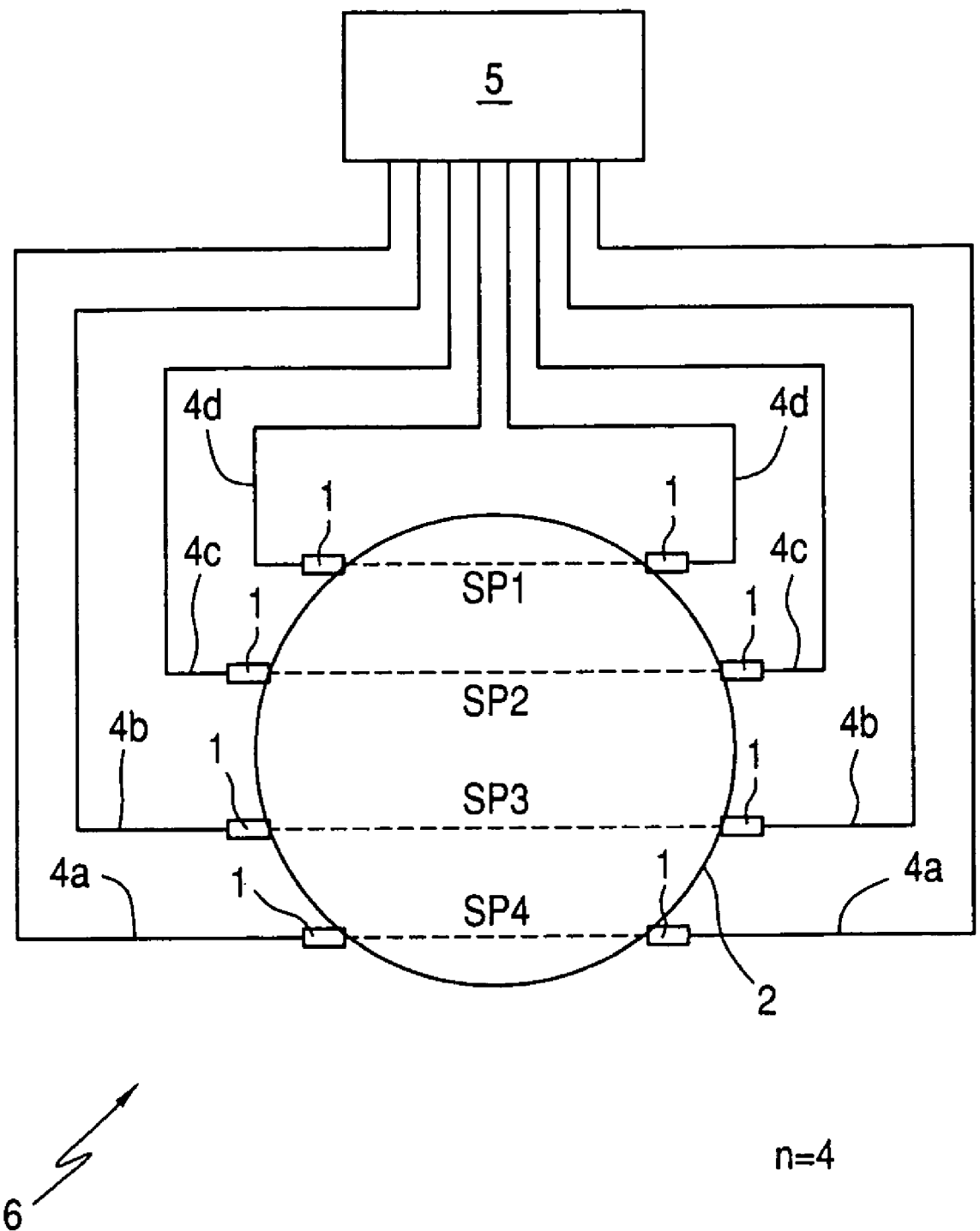
FIG. 1 a schematic illustration an ultrasonic flow measuring device for performing the method of the invention.

FIG. 1 shows a schematic illustration of a first form of embodiment of the ultrasonic flow-measuring device 6 of the invention. Ultrasonic flow measuring device 6 is either an in-line flow measuring device, where the ultrasonic sensors 1 are integrated into the tube wall of a measuring tube 2, or a clamp-on flow measuring device, where the ultrasonic sensors 1 are affixed externally on the pipeline 2 via a securement mechanism. Both types of ultrasonic flow measuring devices 6 are products sold by the assignee.

In order to be able to determine, with high accuracy of measurement, the flow profile of the measured medium 10 flowing in the pipeline 2 or in the measuring tube, four pairs of ultrasonic sensors 1 are arranged distributed over the periphery of the pipeline 2 or measuring tube. The flow velocity or the volume- or mass-flow of the medium 7 through the pipeline 2 or through the measuring tube is determined, in the shown case, via the travel-time difference of ultrasonic measuring signals traveling through the medium 7 in direction of flow and opposite to direction of flow.

The measured values from the individual measuring channels 4a, 4b, 4c, 4d are forwarded from the ultrasonic sensors 1 to the control/evaluation unit 5. Moreover, the control/evaluation unit 5 initiates transmission of the ultrasonic measuring signals in the individual measuring channels SP1, ... SP4 and calculates, on the basis of the travel time difference of the ultrasonic measuring signals in opposite directions, the volume- or mass-flow of the medium 7 in the pipeline 2. On the basis of the radius-dependent distribution of the four pairs of ultrasonic sensors 1 on the pipeline 2, the flow in the pipeline 2 can be determined locationally resolved. This makes it possible to achieve a high accuracy of measurement under the most varied of flow conditions in the pipeline 2.

The control/evaluation unit 5 delivers, according to the invention, besides the measured values of flow, also, via current and/or predictive statements, information concerning the ability of the ultrasonic flow measuring device 6 to function. Furthermore, the method of the invention can provide information concerning process and/or system changes.

Figure 2:
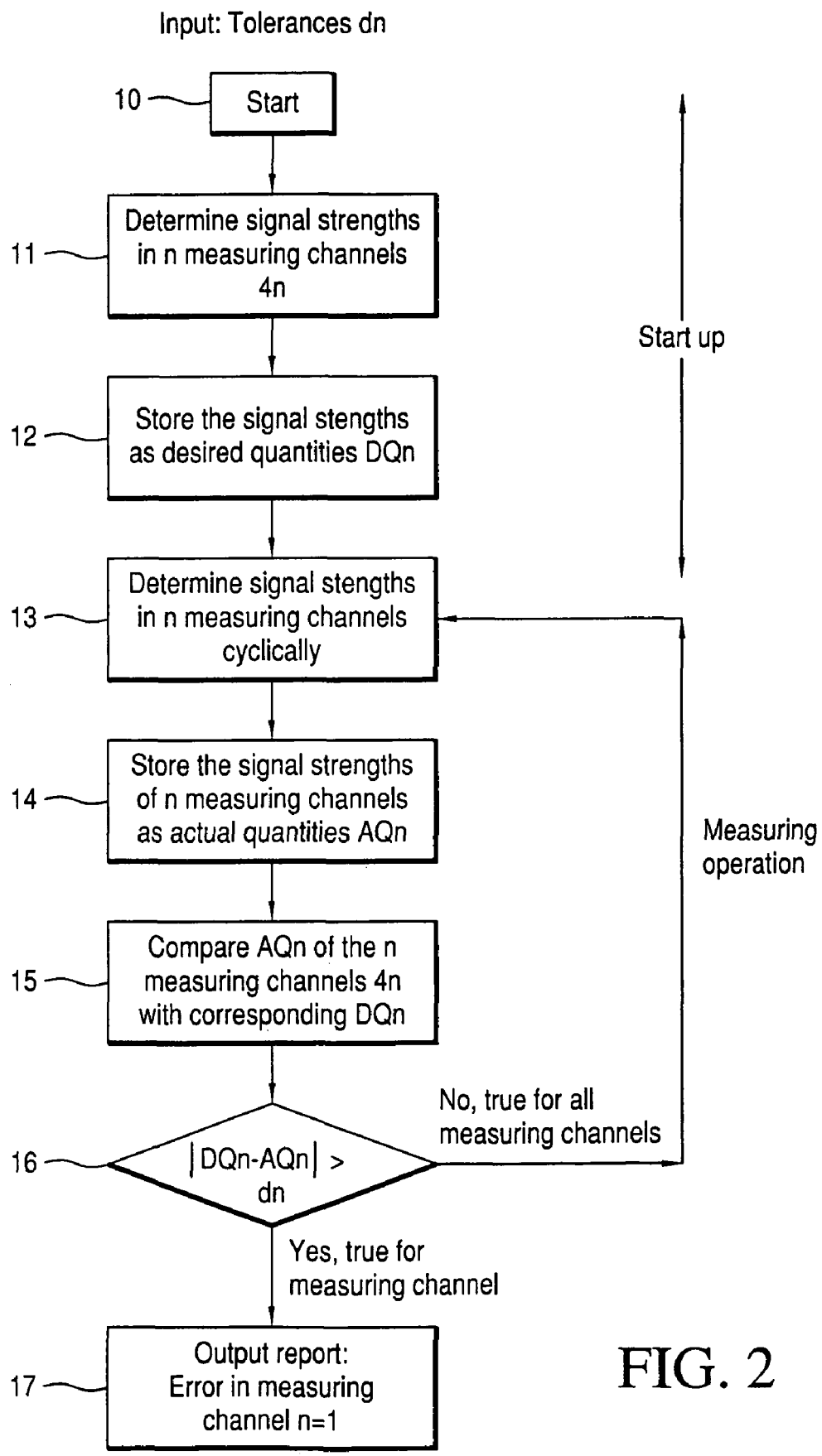
FIG. 2 a flow diagram of a preferred form of embodiment of the method of the invention.

FIG. 2 presents a flow diagram of a preferred form of embodiment of the method of the invention. Allowable tolerance values dn for the n measuring channels 4n, with n=1, 2, ... m, are input. The program is started at program point 10. Following start-up of the flow measuring device 1, the desired quantities DQn are registered in the individual measuring channels 4n (program point 11). In the illustrated case, the desired quantities DQn are, in each case, the signal strength of the ultrasonic measuring signals. At program point 12, the desired quantities DQn ascertained under predetermined system and/or process conditions are stored.

In the measuring operation following thereon, the current signal strengths in the individual n measuring channels 4n are cyclically determined (point 13) and, at program point 14, stored as actual-quantities AQn. At program point 15, the currently measured, actual-quantities AQn are compared with the corresponding, stored, desired quantities DQn. If the size of the difference between the desired quantities DQn and the actual-quantities AQn is larger than or equal to the predetermined tolerance dn, then a report results. In the illustrated case, the difference between actual-quantity AQ1 and desired-quantity DQ1 lies outside of the tolerance d1, while the deviations in the further measuring channels lie within the predetermined tolerances. This is an unequivocal indication that an error exists in the measuring channel n=1. Cause for the error can be a fouling in that measuring channel. Furthermore, it is possible that one of the two ultrasonic sensors 1 in the measuring channel n=1 is defective. In order to obtain a differentiated statement, it is possible to consider stored historical data from the measuring channel n=1. From this, it can be observed, for example, whether the error steadily arose, thus permitting a conclusion of fouling, or whether the error happened abruptly, this permitting one to conclude that a defect exists in one of the two ultrasonic sensors in the measuring channel marked with n=1.

Through the comparison of currently measured, actual-quantities AQn with corresponding, stored, desired quantities DQn and/or through the comparison of the currently measured and, as required, cyclically stored actual-quantities in the individual measuring channels 4n, one can, according to the invention, generate, besides locationally resolved information concerning flow through the pipeline or through the measuring tube, also information concerning the ability of the flow measuring device 6 to function and/or concerning changes in the reigning process and/or system conditions. This serves, on the one hand, for improving the measuring performance of a flow-measuring device 6, and, on the other hand, for recognizing arising malfunctions early, in order that such can be cared for promptly.

The invention claimed is:

1. A method for system- and/or process-monitoring in the case of an ultrasonic flow-measuring device having a plurality of measuring channels, wherein a medium flows through a pipeline or measuring tube in the direction of a longitudinal axis of the pipeline or measuring tube, comprising the steps of:
   coupling ultrasonic measuring signals into the pipeline or measuring tube and out of the pipeline or measuring tube in such a manner that they travel through the medium on different sound paths;
   detecting the ultrasonic measuring signals in the individual measuring channels after passage through the pipeline or measuring tube;
   ascertaining at least one actual quantity describing the ultrasonic measuring signal of each measuring channel;
   comprising the actual quantity with a desired quantity captured under predetermined system or process conditions; and
   in the case of a deviation between the ascertained, actual quantity and the captured, desired quantity, a report is output.

2. The method as claimed in claim 1, wherein:
   the report is output when the actual quantity lies outside a predetermined tolerance for desired value.

3. A method for system and/or process monitoring for an ultrasonic flow-measuring device having a plurality of measuring channels, wherein a medium flows through a pipeline or measuring tube in the direction of a longitudinal axis of the pipeline or measuring tube, comprising the steps of:
   coupling ultrasonic measuring signals into the pipeline or measuring tube and out of the pipeline or measuring tube in such a manner that they travel through the medium on different sound paths;
   detecting the ultrasonic measuring signals in the individual measuring channels after passage through the pipeline or measuring tube;
   ascertaining at least one actual quantity describing the ultrasonic measuring signal for a first measuring channel; and
   ascertaining a corresponding actual quantity for a second measuring channel;

comprising the actual quantity of the first measuring channel with the corresponding actual quantity of the second measuring channel; and in the case of a deviation between the actual quantity of the first measuring channel and the actual quantity of the second measuring channel, a report is output.

4. The method as claimed in claim 3, wherein:

the report is output when the actual quantity of the first measuring channel lies outside of a predetermined tolerance for the actual quantity of the second measuring channel.

5. The method as claimed in claim 1, wherein:

the measured actual quantities are stored cyclically.

6. The method as claimed in claim 5, wherein:

on the basis of the cyclically measured and stored, actual quantities, historical data reflecting trend of system- or process-changes are made available.

7. The method as claimed in claim 1, wherein:

the signal strength of the ultrasonic measuring signals or velocity of sound in the medium is applied as actual quantity.

8. The method as claimed in claim 1, wherein:

in case of a change of the actual quantity, signal strength, relative to the captured, desired quantity, signal strength, a report is output that a more strongly absorbing or a more weakly absorbing medium is flowing through the pipeline or measuring tube.

9. The method as claimed in claim 3, wherein:

in case of a deviation of the actual quantity, signal strength, in the first measuring channel relative to the actual quantity, signal strength, in the second measuring channel, a report is output that, in the region of one of the two measuring channels, a system error has arisen or that, in the corresponding measuring channel, a fouling has occurred.

10. The method as claimed in claim 3, wherein:

in case of a simultaneous change of velocity of sound in all measuring channels and same medium, an indication of a temperature change of the medium is output.

11. The method as claimed in claim 7, wherein:

in case of a deviation of velocities of sound measured in the individual measuring channels, a report is output that the medium exists as a plurality phases.

12. The method as claimed in claim 3, wherein:

the measured actual quantities are stored cyclically.

13. The method as claimed in claim 12, wherein:

on the basis of the cyclically measured and stored, actual quantities, historical data reflecting trend of system- or process-changes are made available.

14. The method as claimed in claim 3, wherein:

the signal strength of the ultrasonic measuring signals or velocity of sound in the medium is applied as actual quantity.

15. The method as claimed in claim 3, wherein:

in case of a change of the actual quantity, signal strength, relative to the captured, desired quantity, signal strength, a report is output that a more strongly absorbing or a more weakly absorbing medium is flowing through the pipeline or measuring tube.

\* \* \* \* \*